United States Patent Office 3,401,175
Patented Sept. 10, 1968

3,401,175
PHOSPHINYLOXY- AND PHOSPHINOTHIOYLOXY-N-ARYLPHTHALIMIDES
Graham O. Osborne, Christchurch, South Island, New Zealand, and Royston H. Davis, Kent, England, assignors to Shell Oil Company, New York, N.Y., a corporation of Delaware
No Drawing. Filed Feb. 16, 1966, Ser. No. 527,768
Claims priority, application Great Britain, Feb. 23, 1965, 7,768/65
3 Claims. (Cl. 260—326)

ABSTRACT OF THE DISCLOSURE

Insecticidal alkoxy and haloalkoxy phenyl-phosphinyloxy- and phosphinothioyloxy-1,3-isoindolediones substituted at the 2-position of the indole ring by unsubstituted or substituted phenyl or phenylalkyl moieties.

---

This invention relates to novel organophosphorus compounds, to insecticidal compositions containing them, and to the use of said compounds and compositions in combatting insect pests, and in protecting ornamental and crop plants from attack by insects.

The novel compounds of the invention can be represented by the general formula:

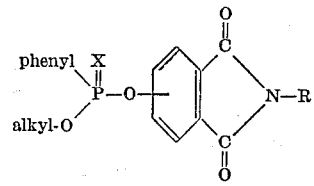

(I)

wherein "phenyl" represents the phenyl group or the phenyl group substituted by from one to a plurality of the substituents: nitro; bromine, chlorine or fluorine; cyano; alkyl, alkoxy and alkylthio of from one to four carbon atoms; amino (—NH₂); mono- and dialkylamino in which each alkyl group contains from one to four carbon atoms; "alkyl" represents unsubstituted alkyl of from one to four (preferably one to two) carbon atoms or such alkyl substituted by from one to a plurality of middle halogen atoms; R is one of the groups represented by "phenyl" or is a phenylalkyl group in which the phenyl moiety is one of the groups represented by "phenyl," and the alkyl moiety contains from one to four carbon atoms, with from one to two carbon atoms bonding the phenyl moiety to the indicated carbon atom, and X is oxygen or sulfur. Additionally, R can be phenyl or phenylalkyl substituted by cycloalkyloxy, aryloxy, alkaryloxy, aralkyloxy, cycloalkylthio, arylthio, alkarylthio, aralkylthio, alkylcarbonyl, cycloalkylcarbonyl, arylcarbonyl, alkarylcarbonyl, aralkylcarbonyl, alkyloxycarbonyl, cycloalkyloxycarbonyl, aryloxycarbonyl, alkaryloxycarbonyl, aralkyloxycarbonyl, alkylsulfonyl, arylsulfonyl, alkarylsulfonyl, aralkylsulfonyl, cyano, imino, or nitro, or groups represented by the formulae

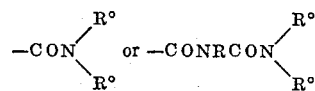

wherein each R° individually represents hydrogen or alkyl, cycloalkyl, aryl, alkaryl or aralkyl. Hydrocarbon moieties present in the substitutent group(s) preferably are one of those described in the immediately preceding paragraph. Preferred substitutents are fluorine, chlorine and bromine, nitro, cyano, alkoxy, alkylthio, alkoxycarbonyl, alkylcarbonyl, alkylamino and dialkylamine containing up to 4 carbon atoms in each of the alkyl radicals, and aralkyloxycarbonyl containing up to 10 carbon atoms.

Most preferable hydrocarbyl groups represented by "phenyl" and R are phenyl and alkyl-substituted phenyl and in the case of R, additionally benzyl and alkyl-substituted benzyl.

Most preferable substituted hydrocarbyl groups represented by "phenyl" and R are phenyl substituted with one or more of chlorine, alkoxy and alkylthio containing 1-4 carbon atoms, and nitro. The "alkyl" group, and any alkyl group present as a substituent or as part of a substituent suitably is of either straight-chain or branched-chain configuration. "Phenyl" thus may be phenyl, any of the isomeric mono-, di- and tri- or other polyhalophenyls or the corresponding bromine, or mixed, analogs, such as p-chlorophenyl, 2,4- and 2,6-dichlorophenyl, 2,3,5-trichlorophenyl, 2,3,4,5,6-pentachlorophenyl, o-bromophenyl, 2-bromo-4-chlorophenyl, 2-chloro-6-bromophenyl or the like, or it may be one of the mono- or poly-, cyano-, alkyl-, alkoxy- or alkylthio-phenyl, or mixed isomers, such as p-cyanophenyl, the isomers of methylphenyl, the isomeric dimethylphenyls, the ethylphenyls, p-methoxyphenyl, 3,5-dimethoxyphenol, 3-chloro - 4 - methylphenyl, p-methylthiophenyl, 2-chloro-5-cyanophenyl, or the like, or it may be an amino-substituted phenyl moiety, such as p-(methylamino)phenyl, p-(dimethylamino)phenyl, or the like, or mixed, such as 2,6-dimethyl-4-(dimethyl amino)-phenyl, or the like. When substituted, "phenyl" preferably contains no more than 12 carbon atoms. R can be one of the above, or it can be a phenylalkyl group in which the phenyl moiety is one of the above, examples including benzyl, alpha-methylbenzyl, phenethyl, p-(dimethylamino) benzyl, p-chlorobenzyl, and the like. R preferably contains no more than 12 carbon atoms.

In this specification, these compounds will be named as substituted 1,3-isoindolediones, in accordance with the conventional numbering system:

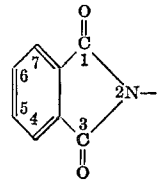

The organophosphorus moiety can be bonded at any of the carbon atoms at the 4- and 5-positions in the ring (in these symmetrical compounds, the 6- and 7-positions are equivalent to the 4- and 5-positions), but preferably, from the standpoint of over-all insecticidal properties, the organophosphorus moiety is bonded to the carbon atom at the 5-position in the ring. For the same reason, any halogen present preferably is chlorine and X preferably is sulfur.

The general character of these compounds is illustrated by the five species whose preparation and testing as insecticides is described in the working examples. In addition, the following species further illustrate the general class:

5-(p-chlorophenylethoxyphosphinothioyloxy)-2-benzyl-1,3-isoindoledione;

5-(p-chlorophenylethoxyphosphinothioyloxy)-2-phenyl-1,3-isoindoledione;

5-(2,4-dichlorophenylmethoxyphosphinothioyloxy)-2-benzyl-1,3-isoindoledione;

5-(2,6-dichlorophenylmethoxyphosphinothioyloxy)-2-phenyl-1,3-isoindoledione;

4-(p-nitrophenylethoxyphosphinothioyloxy)-2-phenyl-1,3-isoindoledione;

5-(p-nitrophenylmethoxyphosphinothioyloxy)-2-benzyl-1,3-isoindoledione, 5-(p-chlorophenylethoxyphosphinothioyloxy)-2-alpha-methylbenzyl-1,3-isoindoledione;
5-(phenylmethoxyphosphinothioyloxy)-2-(p-nitrophenyl)-1,3-isoindoledione;
5-(phenylethoxyphosphinothioyloxy)-2-(p-nitrophenyl)-1,3-isoindoledione;
5-(phenylmethoxyphosphinyloxy)-2-phenyl-1,3-isoindoledione;
5-(phenylethoxyphosphinyloxy)-2-phenyl-1,3-isoindoledione;
5-(phenylethoxyphosphinyloxy)-2-phenyl-1,3-isoindoledione;
5-(4-dimethylamino)phenylmethoxyphosphinothioyloxy)-2-phenyl-1,3-isoindoledione;
5-(phenylmethoxyphosphinothioyloxy)-2-(p-dimethylphenyl)-1,3-isoindoledione;
5-(3-cyanophenylmethoxyphosphinothioyloxy)-2-phenyl-1,3-isoindoledione;

These novel compounds can be prepared by techniques known to the chemical art for the phosphorylation of a hydroxy- or mercapto - 1,3 - isoindoledione. Thus, these compounds may be prepared by a process which comprises reacting a compound having the formula:

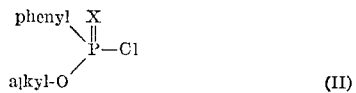
(II)

wherein the symbols have the respective meanings hereinbefore specified, with a compound having the formula:

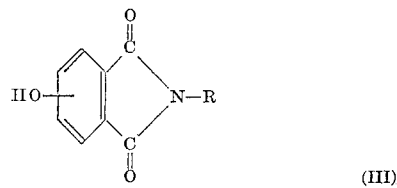
(III)

wherein the symbols have the respective meanings hereinbefore specified, in the presence of a hydrogen halide acceptor, preferably an alkali or alkaline earth metal carbonate, or a nitrogenous base, for example, pyridine, lutidine, ammonia or triethylamine.

Alternatively, the novel compounds can be prepared by reacting the compound having the formula:

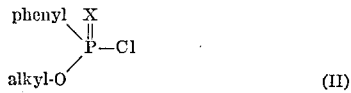
(II)

with a compound having the formula:

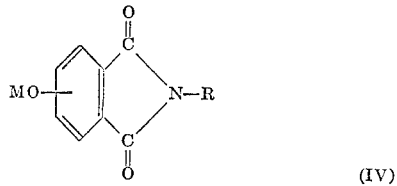
(IV)

wherein the symbols have the respective meanings hereinbefore specified and M represents an alkali or alkaline earth metal, or ammonium. The compounds having the Formula IV, wherein M represents an alkali metal are preferably prepared by reacting a compound having Formula III with an alkoxide of the alkali metal in an alkanol corresponding with the alkoxide, for instance $CH_3ONa$ in methanol or $C_2H_5ONa$ in ethanol.

The above reactions are carried out in an inert liquid reaction medium which may be a solvent for the reactants or for the desired products, or, preferably, for both. Aliphatic ketones, such as acetone, methyl ethyl ketone and methyl isobutyl ketone, are especially suitable for this purpose. Other suitable inert liquid reaction media are, for example, benzene, diethyl ether, diisopropyl ether, tetrahydrofuran, chloroform, and carbon tetrachloride. The reactants are preferably employed in substantially equimolar amounts. The reactions may be carried out at a temperature between 0 and 150° C. Room temperatures or the temperature of the refluxing reaction mixture are usually suitable. The reaction of Compound II with Compound III is preferably carried out at a temperature between 50 and 100° C.

The final reaction mixtures obtained in the reactions may be worked up in any conventional way. Thus, where the reaction has been effected in the presence of a water-miscible solvent such as acetone, the reaction mixture may be poured into water and the reaction product extracted with a suitable solvent, for example, ether, chloroform, methylene chloride, or benzene. Alternatively, the reaction mixture may be filtered to remove precipitated halide, the solvent may then be distilled off, and the residual product taken up in a water-immiscible solvent as mentioned above. The solution may then be washed with water and, if desired, a dilute aqueous solution, of an alkali, for example, sodium bicarbonate or sodium hydroxide, dried, and the solvent removed. In many cases the product obtained in this way is sufficiently pure. However, if desired, it may be purified, for instance by recrystallization from a suitable solvent, such as, for example, hexane, petroleum, ether, methanol, isopropanol, or methyl isobutyl ketone, or by means of chromatography, for instance on a silica gel column.

The 2 - substituted - 5 - hydroxy - 1,3 - isoindolediones used as starting materials in preparation of the compounds of the invention can be prepared by mixing ethanolic solutions of approximately equimolar amounts of 4 - hydroxyphthalic acid and the appropriate amine $RNH_2$ (R having the meaning already set out), evaporating the ethanol at reduced pressure, heating the residual mixture at a temperature between 175 and 270° C. for 20 minutes, cooling it, and purifying the product by recrystallization from a suitable solvent, typical preparations being indicated in Table I.

TABLE I

| $R_3=$ | Reaction Temperature (° C.) | Solvent Used in Crystallization | Melting Point (° C.) |
|---|---|---|---|
| Phenyl | 260 | Ethanol | 250–252 |
| 2-methylphenyl | 260 | Toluene | 229.5–230.5 |
| 3,4-dimethylphenyl | 260 | do | 230–232.5 |
| 2-chlorophenyl | 260 | Ethanol-water | 214–217 |
| 4-chlorophenyl | 200 | Ethanol; toluene | 236–238 |
| 2-bromophenyl | 180–185 | Ethanol-water | 194.5–196 |
| 2,3-dichlorophenyl | 260 | Toluene | 256–258.5 |
| 2-methyl-3-chlorophenyl | 260 | do | 236.5–238 |
| 2-methoxyphenyl | 180–185 | Ethanol | 227–227.5 |
| 2-nitrophenyl | 260 | do | 244–247 |
| 3-nitrophenyl | 200 | Acetone | 280–282 |
| 3-nitro-4-methylphenyl | 260 | Methyl ethyl ketone | 272.5 |
| 2-nitro-4-methylphenyl | 260 | Toluene | 270–273 |
| 2-chloro-4-nitrophenyl | 260 | do | 221–223 |
| 3-acetylphenyl | 260 | Ethanol | 218–220 |
| 4-ethoxycarbonylphenyl | 260 | Toluene | 201–203 |
| 4-methylthiophenyl | 260 | Ethanol | 237–238 |
| 2-methylthiophenyl | 200 | Ethanol-water | 243–245 |
| 3-trifluoromethylphenyl | 260 | Toluene | 215–217 |
| 4-cyanophenyl | 200 | Acetone; methyl ethyl ketone | 286–288 |
| p-Diphenyl | 260 | Ethanol | 310–310.5 |
| 4-acetamidophenyl | 200 | do | 308–310 |
| Benzyl | 220 | Toluene | 189–192 |
| Alpha-methylbenzyl | 180–185 | do | 177.5–179 |
| 2,4-dimethylbenzyl | 180–185 | do | 174–177.5 |
| 2-chlorobenzyl | 180–185 | do | 172–175.5 |
| 2,4-dichlorobenzyl | 180–185 | do | 181.5–184.5 |
| 3-nitrobenzyl | 180–185 | Methanol | 213–214.5 |
| 4-nitrobenzyl | 180–185 | Isopropanol | 221–224 |

The novel compounds according to the invention and the methods by which they are prepared are illustrated by the examples that follow in which parts by weight ($w$) and parts by volume ($v$) bear the same relation as the kilogram to the litre.

Example I.—Preparation of 5-(phenylethoxyphosphinothioyloxy)-2-benzyl-1,3-isoindoledione 5 - hydroxy - 2 - benzyl - 1,3 - isoindoledione ($2.53w$) was dissolved in dry acetone ($50v$). Potassium carbonate ($0.8w$) and ethyl phenylphosphonochloridothionate ($2.4w$) were added to the solution with stirring. Stirring of the mixture was continued for 1 hour at room temperature. The mixture was then refluxed for 30 minutes. The reaction mixture was filtered, the filtrate was evaporated to low bulk, and the concentrate was purified by means of column chromatography using silica gel and a 50/50 ether/hexane mixture as diluent. The desired product in the form of a yellow oil ($3.3w$) was obtained. Yield was 75%.

Analysis.—(Percent by weight): Found: C, 63.0; H, 4.8; N, 3.4; P, 7.0. $C_{23}H_{20}NO_4P$ requires: C, 63.2; H, 4.6; N, 3.2; P, 7.1.

Example II.—Preparation of 5-(phenylethoxyphosphinothioyloxy)-2-(3-chloro-4-methylphenyl)-1, 3-isoindoledione This compound was prepared by the same method as described in Example I using 5-hydroxy-2-(3-chloro-4-methylphenyl)-1,3-isoindoledione and ethyl phenylphosphonochoridothionate as starting materials. The desired product was obtained in the form of white crystals, M.P. 111°–112° C. Yield was 80%.

Analysis (Percent by weight).—Found: C, 63.0; H, 4.8; N, 3.4; P, 7.0. $C_{23}H_{20}NO_4P$ requires: C, 63.2; H, 4.6; N, 3.2; P, 7.1.

Example III.—Preparation of 5-(phenylethoxyphosphinothioyloxy)-2-phenyl-1,3-isoindoledione 5-hydroxy-2-phenyl-1,3-isoindoledione and ethyl phenylphosphonochloridothionate were reacted together in the manner described in Example I yielding the desired product in the form of white platelets, M.P. 118°–119° C. Yield was 65%.

Analysis (Percent by weight.—Found: C, 62.4; H, 4.3; N, 3.4; P, 7.6. $C_{22}HL_8NO_4PS$ requires: C, 62.5; H, 4.3; N, 3.3; P, 7.5.

Example IV.—Preparation of 5-(phenylmethoxyphosphinothioyloxy)-2-benzyl-1,3-isoindoledione 5-hydroxy-2-benzyl-1,3-isoindoledione ($0.5w$) was dissolved in dry acetone ($50v$) and dry potassium carbonate ($0.35w$) was added to the solution. The mixture was stirred for half an hour. A deep-yellow suspension was formed and to this suspension was added methyl phenylphosphonochloridothionate ($1.03w$). The resulting mixture was stirred for 2½ hours at room temperature. The reaction mixture was filtered, the filtrate was evaporated to low bulk, and the concentrate was purified by column chromatography on a silica gel column using as eluent a 10% solution of ethyl acetate in light petroleum (B.P. 60°–80° C.). The desired product in the form of white crystals, M.P. 82°–84° C., was obtained in 69% yield.

Analysis (Percent by weight).—Found: C, 62.5; H, 4.3; N, 3.3; P, 7.4. $C_{22}HL_8NO_4PS$ requires: C, 62.4; H, 4.3; N, 3.3; P, 7.3.

Example V.—Preparation of 5-(phenylmethoxyphosphinothioyloxy)-2-phenyl-1,3-isoindoledione 5 - hydroxy - 2 - phenyl - 1,3-isoindoledione and methyl phenylphosphonochloridothionate were reacted together in the manner described in Example I yielding the desired product in the form of white crystals. M.P. 70°–71° C. Yield was 62%.

Analysis (Percent by weight).—Found: C, 61.8; H, 3.9; N, 3.3; P, 7.2. $C_{21}H_{16}NO_4PS$ requires: C, 61.6; H, 3.9; N, 3.4; P, 7.6.

The utility of compounds of the invention as insecticides is illustrated by the following insecticidal tests which give an indication of the "kill" obtained with a 0.1% solution of active ingredient in an acetone/emulsifier mixture. The insect species used were houseflies, *Aedes aegypti* mosquito larvae, mustard beetle, diamond-back moth larvae, pea aphids, and two-spotted spider mite abbreviated H.f., A.a., M.b., D.b.m. P.a., and T.s.m., respectively. In the table below, A indicates total kill, B partial kill and C no kill of the test insects

| Compound of example | Kill of insects | | | | | |
|---|---|---|---|---|---|---|
| | H.f. | A.a. | M.b. | D.b.m. | P.a. | T.s.m. |
| I | B | B | A | A | C | C |
| II | B | C | C | C | C | B |
| III | A | A | A | A | C | C |
| IV | C | C | B | B | C | C |
| V | A | A | A | A | A | B |

According to another feature of the invention, the novel compounds of this invention may be formulated as insecticidal compositions comprising one or more of said compounds and a carrier, a surface active agent, or both a carrier and a surface active agent. The carrier may be a solid or liquid and may be of natural or synthetic origin. The carrier may be a fertilizer. The surface active agent may be a wetting, emulsifying or dispersing agent.

The term "carrier" as used herein means a material, which may be inorganic or organic and synthetic or of natural origin, with which the active substance is mixed or formulated to facilitate its storage, transport and handling, or its application to the plant, seed, soil or other object to be treated. The carrier may be a solid, a liquid or a compressed gas.

The carrier material may be any of the carrier materials usually applied in formulating pesticides. Examples of suitable solid carrier materials are talc, gypsum, diatomite, silicates, pyrophylite, clays of the montmorillonite and kaolinite groups, lime, wood flour, sulfur, carbon resins such as, for example, polyvinyl chloride and polymers and copolymers of styrene, waxes, and solid fertilizers. Examples of suitable liquid carrier materials are water, the conventional horticultural petroleum spray oils, aromatic hydrocarbons such as, for example, benzene, toluene, xylene, ethylbenzene, cumene and isodurene, coal tar fractions, straight-run petroleum distillates, thermally or catalytically cracked hydrocarbon oils, platformates, refined gas oil, light lubricating oil fractions, refined kerosine, animal and vegetable oils, and organic solvents such as, for example, methanol, ethanol, isopropanol, n-butanol, amyl alcohol, acetone, methyl ethyl ketone, methyl isobutyl ketone, glycols, glycol ethers, polyalkylene glycol ethers and esters, and chlorinated hydrocarbons.

The surface active agent may be any of the surface active agents usually applied in formulating pesticides. Examples of suitable surface active agents are alkylaryl sulfonates, alkyl sulfates containing at least 10 carbon atoms in the molecule, alkylaryl polyoxyethylene glycol ethers, sorbitan esters of fatty acids containing at least 10 carbon atoms in the molecule, alkylamide sulfonates, and condensation products of ethylene oxide with fatty acid esters, for example, the oleic acid ester of anhydrosorbitol. Although both anion- and cation-active surface active agents may be used, the non-ionic surface active agents are preferred.

The compositions of the invention may be concentrates, suitable for storage or transport and containing, for example, from 10 to 95% by weight of a compound of the invention or may be dilute compositions containing, for instance, 0.00001 to 2% or even up to 10% by weight of active compound based on the total weight of the composition.

The compositions of the invention may be formulated as dusts comprising an intimate mixture of a compound of the invention and a finely powdered solid carrier, as wettable powders comprising a compound of the invention mixed with a dispersing agent and, if desired, a finely divided solid carrier, or as emulsifiable concentrates which are concentrated solutions or dispersions of a compound of the invention in an organic liquid, preferably a water-insoluble organic liquid, for example a petroleum hydrocarbon fraction, preferably containing an added emulsifying agent. Aqueous emulsions or dispersions containing an organophosphorus compound as specified above are also within the scope of the invention.

The compositions of the invention may contain in addition to the pesticidal organophosphorus compounds specified above, other ingredients, for example, stickers, wetting agents, synergists, stabilizers, or biologically active substances such as other insecticides, fungicides or herbicides. Thus, insecticides such as, for example, 1,1,1-trichloro-2,2-bis(p-chlorophenyl)ethane;
endrin;
dieldrin;
aldrin;
O,O-dimethyl-O-(2,2-dichlorovinyl)phosphate;
O,O-dimethyl-O-(1,2-dibromo-2,2-dichloroethyl)-
 phosphate;
O,O-dimethyl-O-[1-methyl-2(1-phenylcarbethoxy)-
 vinyl]phosphate;
O,O-dimethyl-O-(2-N,N-dimethylcarbamoyl-1-
 methylvinyl)phosphate;

rotenone and pyrethrum may be incorporated in the compositions of the invention.

The present invention also relates to a method of combating insects which comprises bringing the insects into contact with one or more of the compounds or compositions specified above. Furthermore, the invention relates to a process for improving crop yields which comprises applying one or more of the compounds or compositions specified above to a crop area before or after crop planting, or before or after crop emergence.

We claim as our invention:
1. A phosphorus ester of the formula

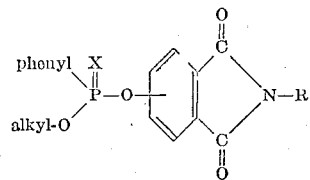

wherein "phenyl" represents a member of the group consisting of phenyl and phenyl substituted by not more than five chlorine, or not more than three fluorine, or 1 to 2 substituents chosen independently from the group consisting of nitro, bromine, chlorine, fluorine, cyano, alkyl of 1 to 4 carbon atoms, alkoxy of one to 4 carbon atoms, and alkylthio of from 1 to 4 carbon atoms, and amino and mono- and dialkylamino in which each alkyl contains from 1 to 4 carbon atoms; "alkyl" represents a member of the group consisting of alkyl of 1 to 4 carbon atoms; and R represents a member of the group consisting of unsubstituted and substituted phenyl and phenylalkyl in which the alkyl moiety contains from 1 to 4 carbon atoms with 1 to 2 of the carbon atoms bonding the phenyl moiety to the indicated nitrogen atom, and wherein the substituted phenyl or phenylalkyl is one of the moieties described for the substituted "phenyl" above, and X represents a member of the group consisting of oxygen and sulfur.

2. 5 - (phenylmethoxyphosphinothioyloxy) - 2-phenyl-1,3-isoindoledione.

3. 5 - (phenylethoxyphosphinothioyloxy)-2-phenyl-1,3-isoindoledione.

References Cited
UNITED STATES PATENTS 3,336,188  8/1967  Tolkmith et al. _____ 167—33
3,277,113  10/1966  Mannes et al. _____ 260—326

NICHOLAS S. RIZZO, *Primary Examiner.*

J. A. NARCAVAGE, *Assistant Examiner.*